Mar. 6, 1923.
A. M. THOMPSON.
OIL INDICATOR FOR VEHICLES.
FILED JUNE 3, 1921.
1,447,824.
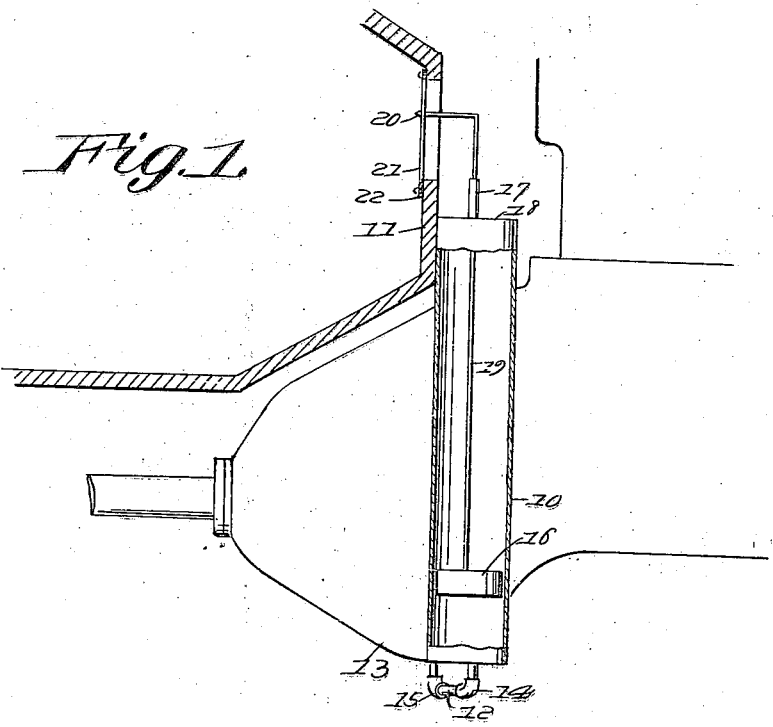
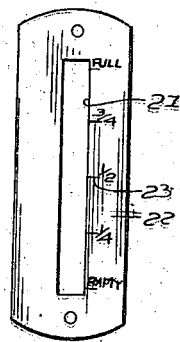

Patented Mar. 6, 1923.

1,447,824

UNITED STATES PATENT OFFICE.

ALEXANDER M. THOMPSON, OF BELLEVILLE, ALABAMA.

OIL INDICATOR FOR VEHICLES.

Application filed June 3, 1921. Serial No. 474,642.

*To all whom it may concern:*

Be it known that ALEXANDER M. THOMPSON, a citizen of the United States of America, residing at Belleville, in the county of Conecuh and State of Alabama, has invented new and useful Improvements in Oil Indicators for Vehicles, of which the following is a specification.

The object of the invention is to provide an oil indicating means attachable to a motor driven vehicle particularly of the Ford and similar types for disclosing to the driver the depth of oil in the crank case or oil reservoir of the motor and hence the necessity for refilling or recharging the same when the supply is about to be exhausted, as a means of avoiding the necessity of testing the depth of oil or interrupting the operation of the motor in order to ascertain the condition of the lubricant supply; and with this object in view the invention consists in a construction and combination of parts of which a preferred embodiment is shown in the accompanying drawings, wherein:—

Figure 1 is a sectional view of an indicating apparatus applied in the operative position to a vehicle of the Ford type, the latter being partly shown in outline to indicate the position of the apparatus.

Figure 2 is a front view of the indicator scale as viewed from the driver's seat.

The device consists essentially of a cylinder 10 suitably attached with relation to the plane of the dash 11 of the vehicle and connected by a communicating tube 12 with the bottom of the motor casing or crank case 13, suitable elbows 14 and 15 being arranged at the extremities of the conductor 12 for attachment respectively to said crank case and cylinder and the elbow 15 having one terminal threaded for engagement with the drain plug hole in the motor casing, to the end that the apparatus may be applied to the motor simply by removing from the latter the usual drain plug and substituting the elbow 14 for the same.

Within the cylinder 10 is arranged a float 16 which rests upon the surface of the oil in the cylinder, the level of which corresponds with that in the motor or crank casing, and extending from the float through a suitable guide tube 17 at the upper end of the cylinder, the latter being closed by a head 18, is a wire or rod 19 provided at its extremity with an index finger 20 extending through a slot 21 in the indicator plate 22 to traverse a scale 23 on said plate, the latter being secured preferably to the inner or rear surface of the dash within plain view of the driver of the vehicle. Obviously the position of the index finger on the scale will indicate to the operator the amount of oil or lubricant proportionately in the motor or crank casing and therefore will serve as a warning to him, in ample time, to provide an additional supply.

Having described the invention, what is claimed as new and useful is:—

In a device for the purpose indicated, the combination with an auto vehicle and driving motor therefor, of a cylinder arranged in the vertical plane adjacent the dash or the vehicle, connections between the bottom of the cylinder and the crank case of the motor to provide for the entrance of oil from the crank case into the cylinder, a float mounted in the cylinder, the dash being formed with a vertical slot, an indicator mounted on the inner face of the dash and formed with a slot corresponding with the slot in the dash and in registration therewith, a rod up-standing from the float and projecting slidably through an opening formed in the upper end of the cylinder, and a pointer formed with a right angular bend of which the free extremity moves in the slot in the indicator plate to traverse a scale thereon, the pointer being carried by the upper end of said rod.

In testimony whereof he affixes his signature.

ALEXANDER M. THOMPSON.